United States Patent
Nishii et al.

(10) Patent No.: US 6,820,751 B2
(45) Date of Patent: Nov. 23, 2004

(54) LIGHT-TRANSMITTABLE LINEAR PHOTOCATALYTIC FILTER MATERIAL, FILTER TO WHICH THE MATERIAL IS APPLIED, AND PROCESS FOR PRODUCTION THEREOF

(75) Inventors: Yoshikazu Nishii, Tokyo (JP); Souji Arai, Tokyo (JP)

(73) Assignee: Hoya Candeo Optronics Corporation, Saitama (JP)

( * ) Notice: Subject to any disclaimer, the term of this patent is extended or adjusted under 35 U.S.C. 154(b) by 117 days.

(21) Appl. No.: 10/254,606

(22) Filed: Sep. 26, 2002

(65) Prior Publication Data

US 2003/0057404 A1 Mar. 27, 2003

(30) Foreign Application Priority Data

Sep. 27, 2001 (JP) ........................................ 2001-335723

(51) Int. Cl.[7] .............................................. B01D 39/06
(52) U.S. Cl. ........................ 210/504; 55/514; 55/523; 55/524; 210/509; 156/73.6; 156/219
(58) Field of Search .................... 55/512, 514, 523, 55/524, 527; 156/60, 73.6, 219–221; 210/490, 491, 497.1, 500.26, 504, 506, 508, 509; 252/520.22, 521.3; 422/312; 501/32, 37–39, 53–55

(56) References Cited

U.S. PATENT DOCUMENTS 6,468,428 B1 * 10/2002 Nishii et al. ............. 210/497.3

FOREIGN PATENT DOCUMENTS

| JP | 10-118415 | * | 5/1988 |
| JP | 9-225262 | * | 9/1997 |
| JP | 2000-5691 | * | 1/2000 |
| WO | 97/31703 | * | 4/1997 |

* cited by examiner

Primary Examiner—Joseph Drodge
(74) Attorney, Agent, or Firm—Nixon & Vanderhye P.C.

(57) ABSTRACT

Light-transmittable linear photocatalytic filter material that can be arranged in parallel in the longitudinal direction without causing a filter to have the form of a barrel when the filter is made of a bundle of a number of such photocatalytic filter materials, each comprising a light-transmittable linear material, a number of particulate materials bonded to an outer side surface of the light-transmittable linear material and a photocatalyst layer formed on said outer side surface and said number of particulate materials, wherein a maximum value of heights from said outer side surface to said photocatalyst layer in a central region of said light-transmittable linear material in the longitudinal direction is smaller than a maximum value of heights from said outer side surface to said photocatalyst layer in regions of both ends thereof.

11 Claims, 5 Drawing Sheets

LIGHT-TRANSMITTABLE LINEAR PHOTOCATALYTIC FILTER MATERIAL, FILTER TO WHICH THE MATERIAL IS APPLIED, AND PROCESS FOR PRODUCTION THEREOF

BACKGROUND OF THE INVENTION

1. Field of the Invention

The present invention relates to a light-transmittable linear photocatalytic filter material having a long and narrow light-transmittable linear material and a number of particulate materials provided on an outer surface of the linear material, and further having a photocatalytic layer formed on or above an outer surface of the linear material and the number of particulate materials; a filter formed of such light-transmittable linear photocatalytic filter materials; and a process for producing the above filter material.

2. Prior Art

A photocatalyst is a material that exhibits functions of sterilization, antimicrobial activity, decomposition, deodorization, non-soiling, non-fogging, and the like when exposed to light. When titanium dioxide, a typical example of the photocatalyst, is exposed to light, the titanium dioxide causes an intense redox reaction on its surface to decompose a substance that is in contact with the surface. For example, when the above substance is an organic substance, the organic substance is decomposed into carbon dioxide gas and water. The photocatalyst decomposes, for example, environmental pollutants such as microorganisms, virus, malodorous substances, dioxin, trichloroethylene, etc., and endocrine-disturbing chemicals that may cause a sick building syndrome.

Attempts are being made to utilize the above photocatalysis for a filter and apply the filter to disposing of various liquids, disposing of various gases and environmental cleaning.

For providing a high-performance photocatalytic filter at a less expensive price, there is proposed a photocatalytic filter material having a filter base material formed by bonding particulate materials to a surface of a long and narrow light-transmittable linear material to form projections and a photocatalyst layer formed on the filter base material (JP-A-10-71312).

When a large number of such photocatalytic filter materials are bundled with aligning their ends on each side to constitute a photocatalytic filter, gaps are formed among the filter materials adjacent side by side owing to the presence of the above projections, so that a fluid to be disposed of can be allowed to flow through the above gaps. Further, passage spaces forming the above gaps do not easily change with the passage of time or are stabilized, so that the photocatalytic filter can maintain performances as a filter for a long period of time.

In the above photocatalytic filter, one end surface or each end surface of a bundle formed of a number of photocatalytic filter materials is provided with a light incidence portion, and light such as ultraviolet ray is allowed to enter the light incidence portion and is propagated inside the photocatalytic filter materials. Since the photocatalyst layer (e.g., titanium dioxide) has a higher refractive index than the linear material (e.g., glass fiber), the propagated light above has no components that undergo total reflection, so that it leaks into the photocatalyst layer.

When an inorganic adhesive containing silica as a main component is used as an adhesive for bonding particulate materials as projections to outer side surfaces of the light-transmittable linear materials, the refractive index of the adhesive satisfies the condition of total reflection since it is equivalent to, or slightly lower than, the refractive index of the light-transmittable linear materials, so that no light leaks into the photocatalyst layer. Since, however, microscopic pores are formed in an interface between the light-transmittable linear materials and the adhesive after the adhesive is baked, there occurs light that leaks into the photocatalyst layer through the pores as base points. Therefore, the light that enters the light incidence portion is not propagated far but gradually leaks into the photocatalyst layer, and the photocatalyst layer is irradiated with the light that has leaked into it.

On the other hand, a fluid to be disposed of is allowed to flow "uniformly" through the passage of gaps of a bundle of a number of the photocatalytic filter materials, whereby the photocatalytic filter traps contaminants contained in the fluid to be disposed of, with the surface of the photocatalyst layer. The photocatalyst layer is irradiated with the above light that leaks into it, whereby the trapped contaminants are decomposed by photocatalysis.

It is expected that the efficiency of the photocatalysis is increased with an increase in the number of photocatalytic filter materials bundled. In reality, however, when the number of the photocatalytic filter materials bundled comes to be thousands, tens of thousands or more, there is caused another new problems.

For example, as shown in FIG. 11, a number of quartz glass spheres 2 (average particle diameter; 50 $\mu$m) as particulate materials are bonded to an outer surface of a fiber 1 made of glass as a long and narrow light-transmittable linear material with an adhesive. Further, a titanium dioxide layer 4 (thickness; 2 $\mu$m) is formed on the above number of quartz glass spheres 2 and an outer surface of the fiber 1 made of quartz glass by a known dipping method, to prepare a glass fiber photocatalytic filter material 90. About 70,000 photocatalytic filter materials 90 are bundled to obtain a photocatalytic filter. In the thus-obtained photocatalytic filter, the following abnormal phenomenon takes place.

As shown in FIG. 12, when such photocatalytic filter materials 90 are bundled with their ends on each side aligned, and housed in a cylindrical case 5 made of aluminum (internal diameter; 70 mm$\phi$, a length; 200 mm) to constitute a photocatalytic filter 91, the photocatalytic filter 91 has the form of a barrel as shown in FIG. 12. The above "form of a barrel" means that photocatalytic filter materials 90 positioned on outer side surface of central portion of the photocatalytic filter 91 swell outwardly in a convex form. As shown in FIG. 12, the middle portions of the photocatalytic filter materials 90 are in close contact with the internal side surface of the cylindrical case 5, and a space portion 7 occurs near an opening on each side of the photocatalytic filter.

The photocatalytic filter 91 sufficiently performs as a filter only when a fluid to be disposed of is allowed to flow "uniformly" through the passage of gaps formed by particulate materials 2 among the photocatalytic filter materials 90 of the photocatalytic filter 91 formed by bundling a number of the photocatalytic filter materials 90 with aligning their ends on each side. In the above space portion 7, however, the flow of the fluid abnormally increases in amount, and the flow comes to be non-uniform, so that the photocatalytic filter cannot sufficiently work as a filter.

As shown in FIG. 13, when an overflow state of a water stream 8 is observed in a test in which a photocatalytic filter formed of a number of photocatalytic filter materials 90 is allowed to stand upright and the water is allowed to flow upwardly in a stream 8 (flow rate: 2 liters/minute), water stream 8 above the above space portion 7 rapidly flows to cause a standing portion 6. The above test result shows the above abnormal phenomenon of a fluid caused by the space portion 7.

SUMMARY OF THE INVENTION

It is therefore an object of the present invention to provide light-transmittable linear photocatalytic filter materials that can be arranged in parallel in the longitudinal direction without causing a filter to have the form of a barrel when the filter is made of a bundle of a number of such photocatalytic filter materials; a filter made of the above photocatalytic filter materials, and a process for the production of the above photocatalytic filter materials.

According to a first aspect of the present invention for achieving the above object, there is provided a light-transmittable linear photocatalytic filter material comprising a light-transmittable linear material, a number of particulate materials bonded to an outer side surface of the light-transmittable linear material and a photocatalyst layer formed on said outer side surface and said number of particulate materials, said light-transmittable linear photocatalytic filter material being for the production of a light-transmittable linear photocatalytic filter in which light enters one end or both ends of said light-transmittable linear material, propagates inside said light-transmittable linear material and leaks into said photocatalyst layer and said photocatalyst layer is irradiated with the leaked light, characterized in that:

a maximum value of heights from the outer side surface of the linear material to the surface of the photocatalyst layer in a central region of said light-transmittable linear material in the longitudinal direction is smaller than a maximum value of heights from the outer side surface of the linear material to the surface of the photocatalyst layer in regions of both ends thereof.

According to a second aspect of the present invention for achieving the above object, there is provided a light-transmittable linear photocatalytic filter material that is according to the first aspect of the present invention and also satisfies requirements that the central region of the outer surface of said light-transmittable linear material in the longitudinal direction has a length in the range of from 20% to 60% based on the total length of said outer surface; that each end region of the outer surface of said light-transmittable linear material in the longitudinal direction has a length in the range of from 20% to 40% based on said total length; and that said particulate materials distributed in said central region has a lower density than said particulate materials -distributed in each end region.

According to a third aspect of the present invention for achieving the above object, there is provided a light-transmittable linear photocatalytic filter comprising a bundle of a large number of light-transmittable linear photocatalytic filter materials according to the first or second aspect of the present invention.

According to a fourth aspect of the present invention for achieving the above object, there is provide a process for producing light-transmittable linear photocatalytic filter materials each of which is made of a long and narrow linear material, a number of particulate materials that are bonded to an outer side surface of the linear material in a predetermined distribution density, and a photocatalyst layer formed on said outer surface and said particulate materials, comprising the steps of:

mixing a number of light-transmittable linear materials, a number of particulate materials and a predetermined amount of an adhesive to temporarily bond said light-transmittable linear materials and said particulate materials, housing said light-transmittable linear materials and said particulate materials that are temporarily bonded, in a container having a pair of facing net-shaped surfaces, placing weights having a bottom having a predetermined area and having a predetermined loading weight on central portions of said net-shaped surfaces to press said light-transmittable linear materials and said particulate materials, and rocking or vibrating said container in a state where said light-transmittable linear materials and said particulate materials are pressed, for a predetermined time period, to rub off particulate materials on a central region of said temporarily bonded linear materials in the longitudinal direction.

PREFERRED EMBODIMENTS OF THE INVENTION

Figure 1:
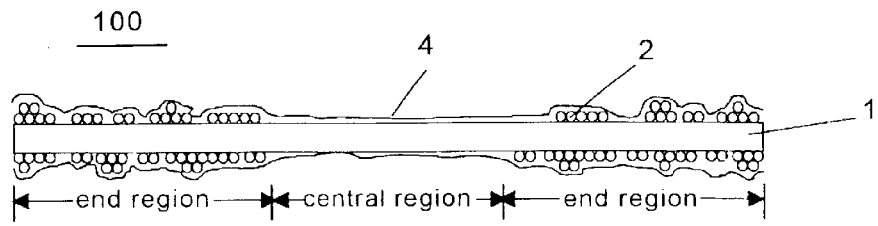
FIG. 1 is a cross-sectional view of a photocatalytic filter material in Example 1, taken along the longitudinal direction.

In light-transmittable linear photocatalytic filter material according to the first aspect of the present invention, the "particulate materials" refers to particles having a spherical, oval or undefined form. Spherical particles are preferred.

The "light-transmittable linear material" refers to a fiber-shaped or rod-shaped linear material that transmits light. Any linear material may be used so long as its internal transmittance of light such as ultraviolet ray or visible light is at least 90%, preferably at least 96% per 10 cm of a length of the linear material at an excitation wavelength of the photocatalyst used. Specific examples of the light-transmittable linear material include a quartz glass fiber and multi-component glass fibers made of silicon dioxide as a main component such as fibers of a silicate glass having a low alkali content, an aluminosilicate glass, a borosilicate glass and alkali-free silicate glass.

The long and narrow light-transmittable linear material can be any one so long as it has a size sufficient to retaining its mechanical strength and is as narrow as possible. For example, a light-transmittable linear material having a diameter of 1 to 500 $\mu$m is preferred, and a light-transmittable linear material having a diameter of 10 to 200 $\mu$m is more preferred. The above limitations are employed for the following reasons. When the above diameter is smaller than 1 $\mu$m, the mechanical strength of the linear material itself is low, and when its end portion is used as a light incidence portion, the efficiency of light incidence is low. When the above diameter is larger than 500 $\mu$m, it is difficult to secure surface areas of such linear materials that are bundled to constitute a filter, and such a filter is not sufficient for practical use. The length of the light-transmittable linear material and the number of such light-transmittable linear materials to be bundled are not critical and can be selected as required depending upon purposes.

When the above particulate materials are spherical (average particle diameter d) and when the long and narrow light-transmittable linear material has the form of a column (diameter D), the particle diameter d of the particulate materials is preferably in the range of 4% to 70%, more preferably 25 to 60%, based on the diameter D of the light-transmittable linear material. It is preferred to use particulate materials having diameters of which the variability is as small as possible, and for example, the variability (difference) of the diameters is preferably in the range of ±30% of an average particle diameter d when the average particle diameter d is taken as a central value.

The reason therefor is as follows. When filter materials are bundled to constitute a filter, and when the particle diameter d of the particulate materials is smaller than 4% of diameter D of the light-transmittable linear material, no large space of gaps can be formed among the filter materials, and the pressure loss increases. When the particle diameter d of the particulate materials is larger than 70% of diameter D of the light-transmittable linear material, the strength of adhesion of the particulate materials to the light-transmittable linear materials is extremely low, so that no stable filter can be obtained. When the variability of the particle diameters is outside ±30% of the central value as an average particle diameter d, the maximum value of heights from an outer surface of the light-transmittable linear materials to the photocatalyst layer on a number of the particulate materials varies to a great extent, and no uniform gaps can be formed, so that no uniform stream of a fluid can be formed. Such a filter therefore cannot be practically used.

The photocatalyst layer is typically a layer of titanium dioxide. Besides it, the photocatalyst layer includes layers formed of substances having photocatalysis such as barium titanate, strontium titanate, sodium titanate, zirconium dioxide, cadmium sulfide and $\alpha$-$Fe_2O_3$. The thickness of the photocatalyst layer is preferably approximately 0.1 $\mu$m to 10 $\mu$m. When the above thickness is smaller than 0.1 $\mu$m, the amount of light absorption is small, and it is difficult to create many catalytic activation sites. When the above thickness is larger than 10 $\mu$m, light cannot reach an outermost surface (reaction surface) of the photocatalyst layer since the photocatalyst layer is irradiated in a manner that the reverse surface of the photocatalyst layer is irradiated. Hence, no catalytic activation site can be formed. In any one of these cases, it is difficult to put such a filter to practical use.

The above-described light-transmittable linear materials have a refractive index of approximately 1.45 to 1.65. The refractive index of the material constituting the photocatalyst layer at an excitation wavelength can be assumed to be 2.0 or more although it is difficult to measure such a value accurately since light absorption takes place. In this case, light that enters the light-transmittable linear material does not satisfy the condition of total reflection, so that it leaks into the photocatalyst layer and the photocatalyst layer can be irradiated with the light that leaks.

In the light-transmittable linear photocatalytic filter material according to the first aspect of the present invention, when a number of such light-transmittable linear photocatalytic filter materials having a number of particulate materials bonded to an outer side surface thereof are bundled to constitute a filter, space portions where the above number of particulate materials are not present are formed as gaps among the light-transmittable linear photocatalytic filter materials, and the gaps constitute a passage for a fluid to be disposed of. When a fluid to be disposed of is allowed to flow through the gaps (passage) among the light-transmittable linear materials of the photocatalytic filter materials, the fluid flows substantially uniformly, and the light-transmittable linear photocatalytic filter materials work as a filter.

In the light-transmittable linear photocatalytic filter material according to the first aspect of the present invention, further, a maximum value of heights from the outer side surface of the light-transmittable linear material to the above photocatalyst layer in a central region of the light-transmittable linear material in the longitudinal direction is smaller than a maximum value of heights from the outer side surface to the above photocatalyst layer in regions of both ends thereof. When a number of such light-transmittable linear photocatalytic filter materials are bundled to constitute a filter, therefore, the bundle (filter) can have the form of a Japanese hand drum or tsuzumi (having an inwardly curved form in a central region of a side surface, the form of a filter having an inwardly curved (concave) side surface in a central region) unlike the above form of a barrel, so that the light-transmittable linear photocatalytic filter materials can be aligned substantially in parallel with one another.

In the light-transmittable linear photocatalytic filter material according to the second aspect of the present invention, the light-transmittable linear photocatalytic filter material according to the first aspect of the present invention satisfies the requirements that the central region of the outer surface of said light-transmittable linear material in the longitudinal direction has a length in the range of from 20% to 60% based on the total length of said outer surface; that each end region of the outer surface of said light-transmittable linear material in the longitudinal direction has a length in the range of from 20% to 40% based on said total length; and that said particulate materials distributed in said central region has a lower density than said particulate materials distributed in each end region. When a number of such light-transmittable linear photocatalytic filter materials are bundled to constitute a filter, therefore, the filter materials can be aligned in the longitudinal direction with a higher parallelism, a fluid to be disposed of can be allowed to flow more uniformly, and the filter exhibits its functions more efficiently.

The reason why the length of central region of the outer surface of the light-transmittable linear material in the longitudinal direction is determined to be in the range of from 20% to 60% based on the total length of said outer surface in the longitudinal direction is as follows. When the above length of central region of the outer surface of the light-transmittable linear material is smaller than 20% of the above total length, a bundle of a number of such filter materials may possibly have the above form of a barrel. When the above length of central region of the outer surface of the light-transmittable linear material is larger than 60% of the above total length, the parallelism of the filter materials in the longitudinal direction can be maintained at a good level, but the mechanical strength of the filter materials may possibly decrease.

The reason why the length of each end region of the outer surface of the light-transmittable linear material in the longitudinal direction is determined to be in the range of from 20% to 40% based on the above total length is as follows. The length of each end region corresponds to a length of one of two end (backward end and forward end) regions other than the above central region. When the length of each end region of the outer surface of the light-transmittable linear material is smaller than 20% of the above total length, the mechanical strength of the filter materials may possibly be low. When the above length is larger than 40%, a bundle of a number of such filter materials may possibly have the above form of a barrel.

In the operation of bundling filter materials, broken pieces from linear materials or particulate materials or foreign matter may be sometimes contained in the central region of the filter materials since they are too small (equivalent to, or smaller than the size of the particulate materials) and overlooked. In this case, when a number of conventional filter materials are bundled to constitute a filter, the bundled filter materials form a convex portion greater than the convex portion of the barrel form shown in FIG. 12, and a space portion that appears near an opening on each end portion is greater than the space portion 7 shown in FIG. 12. The light-transmittable linear photocatalytic filter material according to the present invention is significant as follows. When the filter materials of the present invention are bundled to constitute a filter, the filter materials can maintain their parallelism in the longitudinal direction even in the above case.

The light-transmittable linear photocatalytic filter according to a third aspect of the present invention comprises a bundle of a large number of light-transmittable linear photocatalytic filter materials according to the first or second aspect of the present invention. As a filter case for placing the filter materials therein, tubular cases such as a cylindrical case and a case having the form of a polygonal pillar such as a square pillar or a hexagonal pillar are preferred. The internal diameter of the filter case is determined depending upon the number of the filter materials that are to be bundled. As a material for the filter case, metals such as aluminum and brass and plastics are preferred. The form and the material of the filter case shall not be limited thereto and can be determined as required in designing.

PREFERRED EMBODIMENTS OF THE INVENTION

Figure 2:
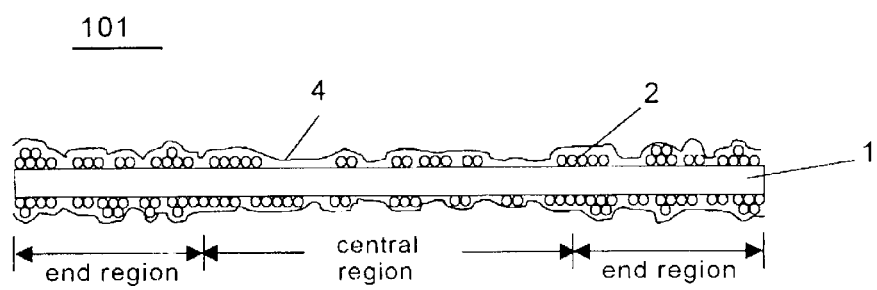
FIG. 2 is a cross-sectional view of a photocatalytic filter material in Example 2, taken along the longitudinal direction.

FIGS. 1 and 2 show cross-sectional view, taken in the longitudinal direction, of light-transmittable linear photocatalytic filter materials 100 and 101 in Examples 1 and 2 of the present invention. In each of FIGS. 1 and 2, a glass fiber 1 itself is the same as the glass fiber shown in FIG. 11. The glass fiber 1 has a diameter of 125 $\mu$m and a length of 200 mm. The glass fiber 1 has an internal transmittance of 97% at a wavelength of 365 nm per 10 cm thereof and has a refractive index (at wavelength of 365 nm) of approximately 1.58.

Figure 11:
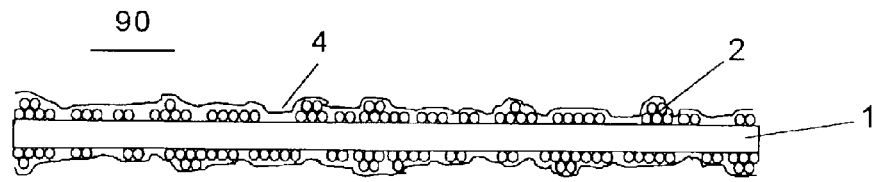
FIG. 11 is a cross-sectional view of a conventional photocatalytic filter material in the longitudinal direction.

Quartz glass spheres 2 shown in FIGS. 1 and 2 are the same as those shown in FIG. 11 in that they have an average particle diameter of 50 $\mu$m and that a number of quartz glass spheres 2 which are stacked on an outer side surface of the glass fiber to form one stage or two or more stages on the outer side surface are distributed as aggregates each of which is formed of two or more spheres adjacent side by side as a unit. The distribution of these spheres 2 differs from that shown in FIG. 11 as follows. Incidentally, a titanium dioxide layer 4 (thickness; 2 $\mu$m) formed as a photocatalyst layer on an outer side surface of the glass fiber 1 and the quartz glass spheres 2 bonded to an outer side surface thereof with an adhesive 3 (see FIGS. 3 and 4) is the same as that shown in FIG. 11, so that a detailed explanation thereof is omitted.

That is, as shown in FIG. 1, quartz glass spheres 2 are not present in the central region of the glass fiber 1 in the longitudinal direction, and quartz glass spheres 1 that are distributed on each end region are stacked to constitute one stage or two stages. In this case, the maximum value of heights from an outer side surface of the glass fiber 1 to the titanium dioxide layer 4 in the central region is 2 $\mu$m, which is the thickness of the titanium dioxide. The maximum value of heights from an outer side surface of the glass fiber 1 to the titanium dioxide layer 4 in each end region corresponds to a total (approximately 102 $\mu$m) of a height of quartz glass spheres 2 forming the two stages (approximately 100 $\mu$m) and the thickness (2 $\mu$m) of the titanium dioxide layer 4. Therefore, the photocatalytic filter material 100 having a central region and each end region is formed such that the central region has a smaller height and that the end regions have a larger height.

In the above filter material 100, the length of the central region thereof is determined to be 60±5 mm, which corresponds to 30% of the total length (200 mm) of the glass fiber 1, the length of each end region of the glass fiber 1 in the longitudinal direction is determined to be 70±5 mm, which corresponds to 35% of the total length, and as described above, the quartz glass spheres 2 are not present in the central region, and aggregates of the quartz glass spheres 2 forming one stage or two stages stacked are scattered in each end region, so that the density of the quartz glass spheres 2 distributed in the central region is lower than the density of the quartz glass spheres 2 distributed in each end region.

Figure 3:
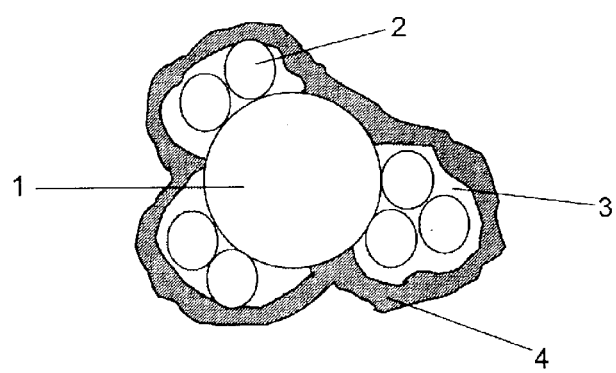
FIG. 3 is a vertical cross-sectional view of end region of each of the photocatalytic filter materials in FIGS. 1 and 2.
Figure 4:
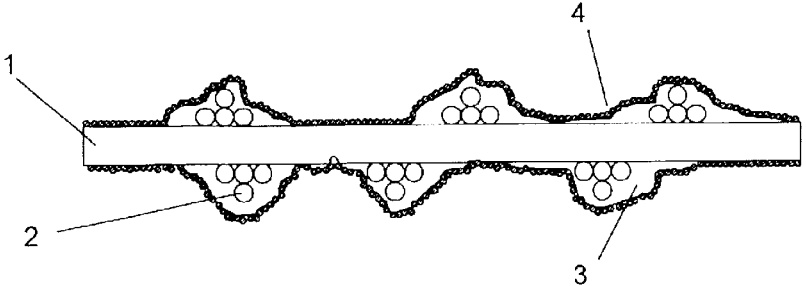
FIG. 4 is a cross-sectional view of an end region of each of the photocatalytic filter materials shown in FIGS. 1 and 2 in the longitudinal direction.

Further, with reference to the above FIG. 1, FIG. 3 that is a cross-sectional view of an end region of the filter material 100 taken at right angles with the longitudinal direction, and FIG. 4 that is a cross-sectional view of part of an end region taken along the longitudinal direction and shows a distribution of the quartz glass spheres, the quartz glass spheres 2 are bonded and fixed to an outer side surface of each end region of the glass fiber 1, such that aggregates formed of two, three or more quartz glass spheres 2 bonded side by side are constituted as a unit. Therefore, the bonding strength of the quartz glass spheres 2 to an outer surface of the glass fiber 1 is high as compared with the bonding strength of such quartz glass spheres that bond to the above outer surface one by one when the same adhesive is used, and the adhesion of the titanium dioxide layer 4 formed thereon is also enhanced.

When a number of such glass fiber photocatalytic filter materials 100 are bundled to constitute a filter, the space of gaps formed by the distribution of the above quartz glass spheres 2 is stabilized and is stable against a change with the passage of time, so that the requirement of uniform flow of a fluid through the filter is satisfied.

In a photocatalytic filter material 101 shown in FIG. 2, all of quartz glass spheres 2 in a central region of a glass fiber 1 in the longitudinal direction form one stage, the quartz glass spheres 2 are bonded and fixed to an outer surface of the glass fiber 1 and distributed such that aggregates formed of two, three or more quartz glass spheres 2 bonded side by side are constituted as a unit, and quartz glass spheres 2 in each end region are distributed such that aggregates similar to the above aggregates are constituted as a unit, and quartz glass spheres 2 are also distributed such that aggregates formed of one or two stages are constituted.

The above photocatalytic filter material 101 therefore satisfies the requirement of uniform flow of a fluid through a filter. The maximum value of heights from an outer side surface of the glass fiber 1 to a titanium dioxide layer 4 in a central region corresponds to a total (52 µm) of a thickness of one stage (50 µm) of the quartz glass spheres 2 and the thickness (2 µm) of the titanium dioxide layer 4, and the maximum value of heights from an outer side surface of the glass fiber 1 to the titanium dioxide layer 4 in each end region corresponds to a total (approximately 102 µm) of the height (approximately 100 µm) of two stages of the quartz glass spheres 2 and the thickness (2 µm) of the titanium dioxide layer 4, so that the photocatalytic filter material 101 having a central region and each end region is formed such that the central region has a smaller height and that the end regions have a larger height.

In the above photocatalytic filter material 101, the length of the central region is determined to be 100±5 mm, which corresponds to 50% of the total length (200 mm) of the glass fiber 1 in the longitudinal direction, the length of each end region of the glass fiber 1 in the longitudinal direction is determined to be 50±5 mm, which corresponds to 25% of the total length. The density of the quartz glass spheres 2 distributed in the central region is determined to be lower than the density of the quartz glass spheres 2 distributed in each end region.

Figure 5:
FIG. 5 is a cross-sectional view of a photocatalytic filter formed by housing a bundle of approximately 70,000 photocatalytic filter materials shown in each of FIGS. 1 and 2 in a cylindrical case.

As shown in FIG. 5, 70,000 photocatalytic filter materials 100 or 101 are bundled, inserted into a cylindrical case 5 made of aluminum (internal diameter 70 mm, length 200 mm) and fixed therein. End surfaces thereof on each side are aligned and polished, and then they are to be used as a light incidence portion, whereby a photocatalytic filter 102 or 103 is completed.

Figure 6:
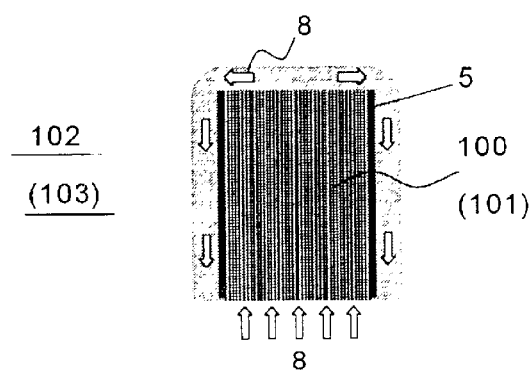
FIG. 6 is a diagram showing water stream when water is allowed to flow through the photocatalytic filter shown in FIG. 5.
Figure 13:
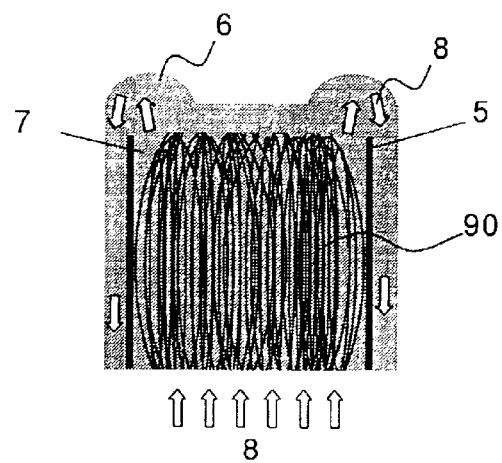
FIG. 13 is a diagram showing water stream when water is allowed to flow through the photocatalytic filter shown in FIG. 12.

The thus-obtained photocatalytic filter 102 or 103 was subjected to the above water stream test, and as shown in FIG. 6, water stream 8 (flow rate: 2 liters/minute) was observed for an overflow on an upper plane thereof. As a result, it was found that water smoothly flowed at a uniform flow rate without causing the standing portion 6 as shown in FIG. 13.

The process for the production of the above photocatalytic filter materials 100 will be explained below.

(Temporary Bonding Step)

First, there are provided 70,000 glass fibers (diameter; 125 µmφ, length; 200 mm, trade name "PFG1 Glass Fiber" supplied by HOYA-SCHOTT" and 40 g of quartz glass spheres 2 (average particle diameter; 50 µm, trade name "SSV-43" supplied by K. K. Tatsumori), and they are encased in a proper container with a cover (width; 80 mm, length; 220 mm, depth; 60 mm, trade name "Natural Pack" supplied by K. K. Nishiyama Kagaku).

Then, 40 ml of an adhesive (trade name "FJ-803" supplied by Tokiwa Denki K. K.) is poured into the container with the above glass fibers 1 and quartz glass spheres in it, and the container was covered. The container was moved backward and forward repeatedly (e.g., stroke; 80 mm, five strokes/minutes) to stir them, whereby there is obtained a properly bonded mixture of the glass fibers 1, the quartz glass spheres 2 and the adhesive. The above mixture is in a bonding state in which the adhesive adheres to the glass fibers 1 and the quartz glass spheres 2 while retaining a proper flowability since it is not yet cured, and the glass fibers 1 and the quartz glass spheres 2 are temporarily bonded to one another through the adhesive.

(Step of Adjusting Distribution of Particulate Materials)

Figure 7:
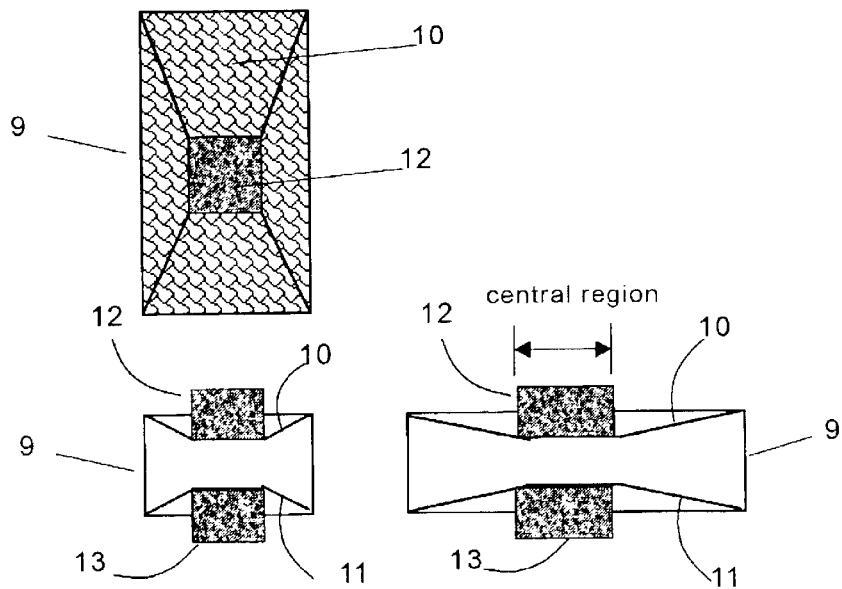
FIG. 7 shows a container that houses a mixture of a number of photocatalytic filter materials, a number of particulate materials and an adhesive, which are temporarily bonded, and having a pair of net-shaped surfaces facing each other upwardly and downwardly, and a state where weights are placed on a pair of the net-shaped surfaces to apply a load.

Then, the properly bonded mixture obtained in the temporary bonding step is placed in a container 9 (width; 100 mm, length; 260 mm, depth; 80 mm) having a net 11 spread in a bottom portion (width; 100 mm, length; 260 mm) and a net-shaped cover 10 as shown in FIG. 7. The net-shaped cover 10 is placed on the container 9. The net-shaped cover 10 and the net 11 in the bottom of the container 9 form a pair of facing mesh surfaces.

The net-shaped cover 10 and the net 11 in the bottom of the container 9 work as mesh surfaces. Corners-rounded acryl blocks 12 and 13 (width; 30 mm, length; 60 mm, height; 40 mm, weight; about 80 g) as weights are placed on central portions of the nets one on each, to apply a load thereon. The nets 10 and 11 are brought into a state where the central portions of the nets 10 and 11 are pressed inwardly into the container 9 by approximately 5 mm.

In the above pressed state, the container 9 is rocked (or may be vibrated instead; "rock" or "rocking" hereinafter may be replaced with "vibrated" or "vibration" hereinafter). In the rocking, the container 9 is moved backward and forward (e.g., stroke; 100 mm, 4 strokes/second) such that the bonded mixture inside the container 9 are moved in an accelerated motion in the width direction of the container.

During the above accelerated motion, the blocks 12 and 13 exert a load particularly on a number of the glass fibers 1 facing the surfaces (width; 30 mm, length; 60 mm) of the blocks 12 and 13. The length (60 mm) of each of the blocks 12 and 13 corresponds to the central region of the glass fibers 1 in the longitudinal direction. Of the quartz glass spheres 2 temporarily bonded to outer side surfaces of the glass fibers 1 with the adhesive, therefore, the quartz glass spheres 2 present in the central region of the glass fibers 1 in the longitudinal direction are rubbed off.

Then, hot air (80° C.) is blown through the net 10 or 11 of the container 9 to dry the adhesive. By the blowing, the quartz glass spheres 2 alone are bonded to outer side surfaces of the glass fibers 1 while the glass fibers 1 are not bonded to one another. The above rocking, the above loading with the blocks and the above blowing with hot air are continued until the adhesive is cured (e.g., for 10 minutes).

As a result, the quartz glass spheres 2 bonded to outer surfaces of the glass fibers 1 have the following distribution density. In the entire length (200 mm) of the outer side surfaces of the glass fibers 1, the density of the quartz glass spheres 2 distributed in the central region (60 mm) of the glass fibers 1 in the longitudinal direction is low, and the density of the quartz glass spheres 2 distributed in each end region (70 mm) is high. The length of the central region of the glass fibers 1 can be adjusted on the basis of dimensions of the loading blocks 12 and 13, and the amount of the quartz glass spheres 2 that are to be rubbed off can be adjusted on the basis of a load (weight) of the blocks 12 and 13, the speed of the repeated backward and forward movement and the operation time period. By the above procedures, the quartz glass spheres 2 having a desired distribution density can be scattered, and the numbers of stacks of the quartz glass spheres 1 in desired regions, that is, heights from the outer side surfaces of the glass fibers 1, can be adjusted.

The above-explained step of adjusting the particulate materials is a simple step in which bonded mixture of glass fibers, quartz glass spheres and an adhesive are rocked while exerting a load on a region where the distribution density of the quartz glass spheres is to be decreased in surfaces of the glass fibers. Therefore, the above step is excellent in mass-productivity and suitable particularly for producing filters each of which is constituted of a larger number of filter materials. Further, since no excess external force is exerted on the glass fibers, there is almost no possibility of the glass fibers being damaged, and the above step serves to the production of filters at goods yields.

(Heating Step)

Then, the glass fibers with a number of the quartz glass spheres bonded thereto, obtained in the above step of adjusting distribution of particulate materials, are taken out of the container 9. Further, for improving the adhesion between the outer side surfaces of the glass fibers 1 and the quartz glass spheres 2, the glass fibers with a number of the quartz glass spheres bonded thereto are placed in a heating furnace and heated (e.g., at 300° C. for 2 hours).

(Step of Forming Photocatalyst Layer)

A titanium dioxide layer 4 is formed on outer side surfaces of the glass fibers with a number of the quartz glass spheres bonded thereto, obtained by the above heating step, by a known dipping method or a blow away method (see JP-A-2000-5691). In this embodiment, a titanium dioxide layer 4 having a thickness of 2 μm was formed by a dipping method.

As shown in FIG. 1, the titanium dioxide layer 4 is formed on the outer surfaces of the glass fibers 1 and on surfaces of the quartz glass spheres 2 bonded to outer surfaces of the glass fibers 1. In the above manner, a number of (approximately 70,000) photocatalytic filter materials of the glass fibers with the quartz glass spheres bonded thereto and with the photocatalyst layer 4 formed thereon can be simultaneously produced.

(Step of Forming Photocatalytic Filter)

As shown in FIG. 5, ends of a number of the photocatalytic filter materials 100 obtained in the above step of forming photocatalyst layer are aligned on each side, and the photocatalytic filter materials 100 are bundled. The bundled photocatalytic filter materials 100 are encased and inserted in a proper cylindrical case 5 (internal diameter; 70 mmφ, length; 200 mm) made of aluminum, to give a photocatalytic filter 102 or 103.

For simplification of explanations of the present invention, the lengths of end portions of the glass fibers 1 on each side which end portions are cut and/or polished for providing a light incidence portion have not been taken account of with regard to the length of the glass fibers 1 and the lengths of the containers and tools used for production concerned hereinabove. For producing a practical photocatalytic filter, the length of the glass fibers 1 is determined beforehand to be longer by taking account of a margin necessary for the cutting and polishing, and the lengths of the containers and tools used for production concerned are determined so as to meet with the above length.

Figure 8:
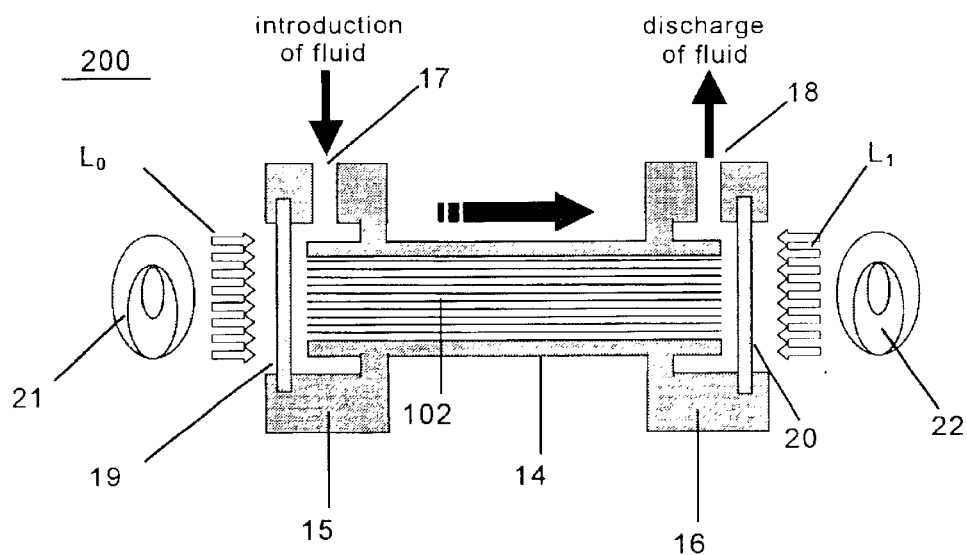
FIG. 8 is a diagram showing the structure of one example of a photocatalytic filter device using the photocatalytic filter of the present invention.

FIG. 8 shows an example of a photocatalytic filter device 200 to which a photocatalytic filter 102 obtained by the above production method is applied. The photocatalytic filter device 200 comprises the photocatalytic filter 102 and ultraviolet light sources 21 and 22 (wavelength; 365 nm, trade name "EX250" supplied by HOYA-SCHOTT).

Around the photocatalytic filter 102, there are provided a filter case 14 housing the above photocatalytic filter materials 100, flange portions 15 and 16 formed on both sides of the filter case 14, a fluid inlet 17 and a fluid outlet 18 provided in side portions of the flange portions 15 and 16, and glass windows 19 and 20 ("Optical Glass F2" supplied by HOYA-SCHOTT, that can cut a wavelength of 300 nm or shorter) for constituting open end surfaces on both sides and transmitting incidence light.

Ultraviolet light sources 21 and 22 are disposed to face the glass windows 19 and 20, and ultraviolet lights $L_0$ and $L_1$ emitted therefrom enter light incidence portions formed on both ends the photocatalytic filter 102 through the glass windows 19 and 20 and propagate in a number of the filter materials 100 constituting the photocatalytic filter 102. The lights leak into the titanium dioxide layers formed on outer side surfaces thereof to irradiate the titanium dioxide layers, whereby the filter produces photocatalysis.

A fluid to be disposed of is introduced through the fluid inlet 17 and allowed to flow through fluid passages of gaps formed among adjacent filter materials with a number of quartz glass spheres 2 bonded to outer side surfaces of a number of the photocatalytic filter materials 100 constituting the photocatalytic filter 102, and contaminants in the fluid are decomposed and removed by the above photocatalysis of the titanium dioxide layers 4. The fluid is discharged through the fluid outlet 18.

Figure 9:
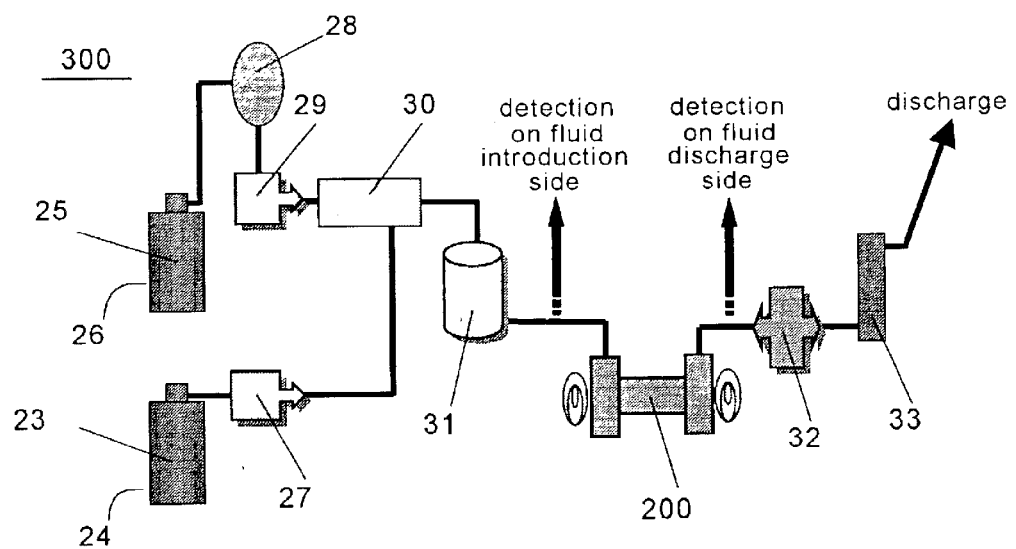
FIG. 9 is a diagram showing an apparatus for evaluating performances of the photocatalytic filter device shown in FIG. 8.

For testing the above photocatalytic filter device 200 for performances, there was prepared an apparatus 300 for evaluating the gas removal performance of a photocatalytic filter shown in FIG. 9. The performance evaluating apparatus 300 has a gas container 24 containing a disposal gas 23 containing contaminants; a pure air container 26 containing pure air 25; a mass flow controller 27 for controlling the flow rate of the disposal gas 23; a humidity controller 28 for controlling the humidity of the pure air 25; a mass flow controller 29 for controlling the flow rate of the pure air; a mixer 30 for mixing the disposal gas 23 and the pure air 25 controlled through the above mass flow controllers 27 and 29 to dilute the disposal gas 23 to prepare a disposal gas having a predetermined concentration; a buffer tank 31 for storing the disposal gas from the mixer 30 once and bringing it to an ordinary pressure state; the above photocatalytic filter device 200 that is to produce photocatalysis when the mixture gas from the above buffer tank 31 is introduced; a pump 32 for introducing the above mixture gas into the above photocatalytic filter device 200 at a predetermined flow rate; and a flow meter 33 for measuring the flow of the mixture gas.

The above members were connected with pipes and tubes made of stainless steel. On the gas inlet side and the gas outlet side of the photocatalytic filter device 200, the mixture gas was detected for gas concentrations with detectors (gas chromatography "FC-14B" supplied by Shimadzu Corporation). The humidity was adjusted to 50% RH as a humidity at a temperature of 25° C. The ultraviolet intensity was adjusted to 8 mW/cm² on each end surface of the fiber bundle, and distances between emission ends of light guides made of quartz glass and connected to the ultraviolet light sources 21 and 22 and incidence ends of the photocatalytic filter 102 are adjusted and fixed. The flow rate was adjusted to 11 liters/minute on the basis of an open/close state of a valve attached to the pump 32 and fixed.

Figure 12:
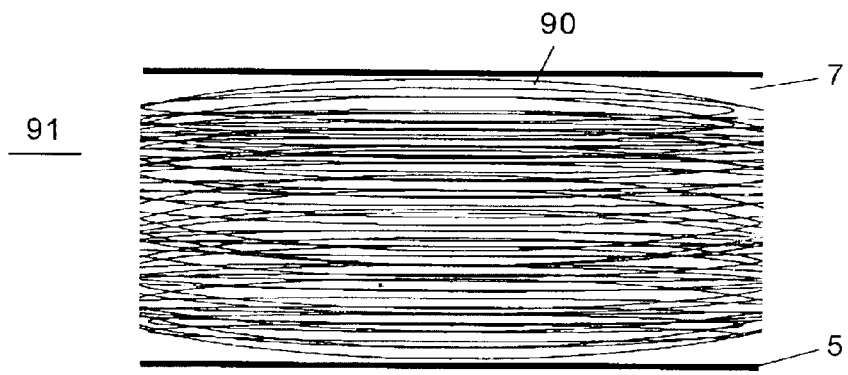
FIG. 12 is a cross-sectional view of a photocatalytic filter formed by housing a bundle of approximately 70,000 conventional photocatalytic filter materials in a cylindrical case.

There was prepared a photocatalytic filter device having the constitution of the above photocatalytic filter device 200 but using a photocatalytic filter 91 formed by bundling glass fiber photocatalytic filter materials 90 in Comparative Example 1 shown in FIG. 11 and FIG. 12. Further, there was prepared a photocatalytic filter device having the constitution of the above photocatalytic filter device 200 and using a photocatalytic filter 102 formed by bundling glass fiber photocatalytic filter materials in Example 1. For forming these photocatalytic filters, 70,000 photocatalytic filter materials were bundled.

Air containing benzene was used as a disposal fluid, and the benzene was detected for concentrations in two places on an air introduction side and air discharge side of the photocatalytic filter, and the benzene removal ratio was calculated on the basis of the expression;

$$\text{Removal ratio} = 1 - \left(\frac{Cd}{Ci}\right)$$

Cd: benzene concentration on air discharge side
Ci: benzene concentration on air introduction side The benzene concentration on the air introduction side was varied, and a change in the benzene removal ratio was observed to evaluate each of the photocatalytic filter devices 200 for performances.

Figure 10:
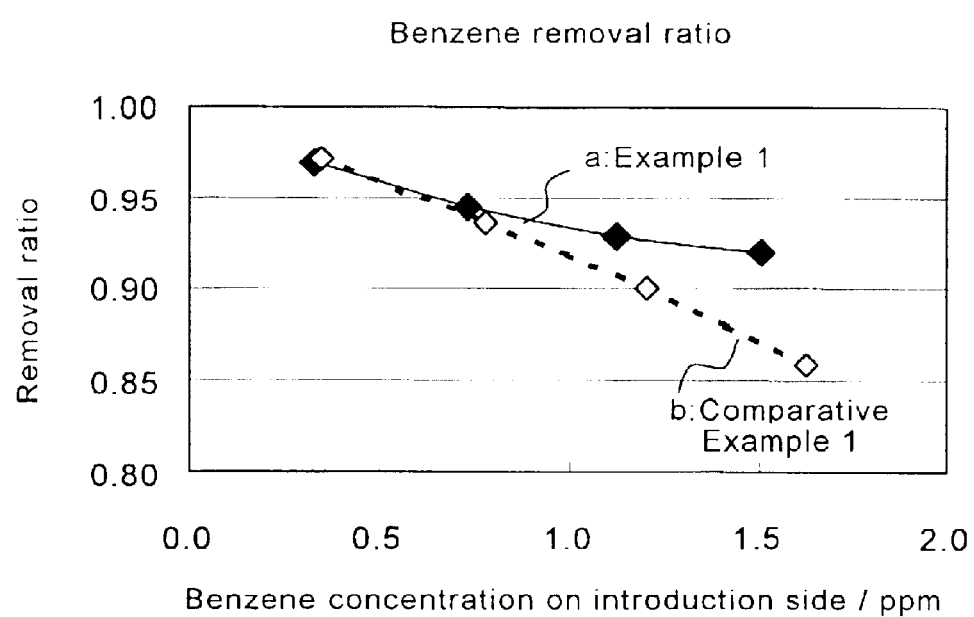
FIG. 10 shows a difference in the removal ratio of benzene between a photocatalytic filter device using the photocatalytic filter materials in Example 1 of the present invention and a photocatalytic filter device using conventional photocatalytic filter materials in Comparative Example 1.

FIG. 10 shows evaluation results, in which a curve "a" shows a change in the benzene removal ratio in Example 1 and a curve "b" shows a change in the benzene removal ratio in Comparative Example 1. When the benzene concentration on the introduction side is increased, the benzene removal ratio attained by the photocatalytic filter in each of Example 1 and Comparative Example 1 decreases. However, the decrease in the removal ratio in Example 1 is small, while the removal ratio in Comparative Example 1 sharply decreases.

The reason for the above results is as follows. In the photocatalytic filter in Example 1, air can be allowed to flow uniformly like water stream shown in the water stream test in FIG. 6, so that the photocatalytic filter can maintain its function as a filter and a decrease in the trapped benzene amount can be suppressed. In the photocatalytic filter in Comparative Example 1, air cannot be allowed to flow uniformly like water stream shown in the water stream test in FIG. 13, so that the benzene trapping ratio (adsorption ratio) is decreased and that the removal ratio is decreased.

When the benzene concentration on the air introduction side is low, a difference between Example 1 and Comparative Example 1 is not so clear as compared with the counterpart when the benzene concentration is high. It is assumed that the concentration on the air discharge side is very low and close to a detection limit of the gas chromatography used, so that a measurement error is caused. It is assumed that the difference only appears to be small and that a larger difference is virtually present between these two.

As explained in detail hereinabove, according to the light-transmittable linear photocatalytic filter material of the present invention, the height from the outer side surface of the filter material to the photocatalyst layer in the central region thereof is smaller than the counterpart in each end region. When a number of such filter materials are bundled to constitute a filter, therefore, the cross section of each filter material has the outer side form of a Japanese hand drum or tsuzumi (that is, a central region of outer side surface of the filter is inwardly curved) instead of a barrel, and such filter materials can be arranged in the longitudinal direction substantially in parallel with one another. Further, when a disposal fluid is allowed to flow through spaces among the filter materials, the fluid can be allowed to flow substantially uniformly, so that the removal ratio of contaminants in the disposal fluid can be improved.

According to the process for the production of a light-transmittable linear photocatalytic filter material, provided by the present invention, a number of the above filter materials can be produced simultaneously in a simple step at high yields.

What is claimed is:

1. A light-transmittable linear photocatalytic filter material comprising a light-transmittable linear material, a number of particulate materials bonded to an outer side surface of the light-transmittable linear material and a photocatalyst layer formed on said outer side surface and said number of particulate materials,
    said light-transmittable linear photocatalytic filter material being for the production of a light-transmittable linear photocatalytic filter in which light enters one end or both ends of said light-transmittable linear material, propagates inside said light-transmittable linear material and leaks into said photocatalyst layer and said photocatalyst layer is irradiated with the leaked light, characterized in that:
    a maximum value of heights from the outer side surface of the linear material to the surface of the photocatalyst layer in a central region of said light-transmittable linear material in the longitudinal direction is smaller than a maximum value of heights from the outer side surface of the linear material to the surface of the photocatalyst layer in regions of both ends thereof.

2. The light-transmittable linear photocatalytic filter material of claim 1, wherein the central region of the outer surface of said light-transmittable linear material in the longitudinal direction has a length in the range of from 20% to 60% based on the total length of said outer surface; each end region of the outer surface of said light-transmittable linear material in the longitudinal direction has a length in the range of from 20% to 40% based on said total length; and said particulate materials distributed in said central region has a lower density than said particulate materials distributed in each end region.

3. A light-transmittable linear photocatalytic filter comprising a bundle of a large number of light-transmittable linear photocatalytic filter materials recited in claim 2.

4. A light-transmittable linear photocatalytic filter material of claim 1, wherein the light-transmittable linear material is a fiber-shaped or rod-shaped linear material that transmits light.

5. A light-transmittable linear photocatalytic filter material of claim 1, wherein the light transmittable linear material has its internal transmittance of at least 90% per 10 cm of a length thereof.

6. A light-transmittable linear photocatalytic filter material of claim 1, wherein the light transmittable linear material is selected from a quartz glass fiber and multi-component glass fiber made of silicon dioxide as a main component.

7. A light-transmittable linear photocatalytic filter material of claim 1, wherein particulate materials are spherical and have a particle diameter d which is in the range of 4% to 70% based on the diameter D of the linear material.

8. A light-transmittable linear photocatalytic filter material of claim 1, wherein particulate materials are made of quartz glass.

9. A light-transmittable linear photocatalytic filter material of claim 1, wherein the photocatalyst layer is made of titanium dioxide.

10. A light-transmittable linear photocatalytic filter comprising a bundle of a large number of light-transmittable linear photocatalytic filter materials recited in claim 1.

11. A process for producing light-transmittable linear photocatalytic filter materials each of which is made of a long and narrow linear material, a number of particulate materials, a long and narrow linear material that are bonded to an outer side surface of the linear material in a predetermined distribution density, and a photocatalyst layer formed on said outer surface and said particulate materials, comprising the steps of:

mixing a number of light-transmittable linear materials, a number of particulate materials and a predetermined amount of an adhesive to temporarily bond said light-transmittable linear materials and said particulate materials, housing said light-transmittable linear materials and said particulate materials that are temporarily bonded, in a container having a pair of facing net-shaped surfaces, placing weights having a bottom having a predetermined area and having a predetermined loading weight on central portions of said net-shaped surfaces to press said light-transmittable linear materials and said particulate materials, and rocking or vibrating said container in a state where said light-transmittable linear materials and said particulate materials are pressed, for a predetermined time period, to rub off particulate materials on a central region of said temporarily bonded linear materials in the longitudinal direction.

* * * * *